United States Patent
Barth

(10) Patent No.: US 9,536,409 B1
(45) Date of Patent: Jan. 3, 2017

(54) SYSTEM AND METHOD FOR ACCIDENT AVOIDANCE DURING MOBILE DEVICE USAGE

(71) Applicant: Intel IP Corporation, Santa Clara, CA (US)

(72) Inventor: Hans-Joachim Barth, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/817,830

(22) Filed: Aug. 4, 2015

(51) Int. Cl.
*G08B 21/02* (2006.01)
*H04W 4/02* (2009.01)

(52) U.S. Cl.
CPC .............. *G08B 21/02* (2013.01); *H04W 4/027* (2013.01)

(58) Field of Classification Search
CPC ........ G01S 15/025; G01S 15/08; G01S 15/93; H04M 2250/12; G08B 21/02
See application file for complete search history.

(56) References Cited

U.S. PATENT DOCUMENTS

| 2016/0057726 A1* | 2/2016 | Bai | H04W 64/00 340/686.6 |
| 2016/0091606 A1* | 3/2016 | Shin | G01S 15/025 367/112 |

* cited by examiner

*Primary Examiner* — Curtis Odom
(74) *Attorney, Agent, or Firm* — Grossman, Tucker, Perreault & Pfleger, PLLC

(57) ABSTRACT

Generally, this disclosure provides systems, devices, methods and computer readable media for accident avoidance during mobile device usage. The mobile device may include a processor, a camera, one or more sensors, and accident avoidance circuitry. The accident avoidance circuitry may include user focus detection circuitry configured to detect that an application executing on the processor requires attention focus of a user of the mobile device; motion detection circuitry configured to determine motion of the mobile device based on input from the camera or from the one or more sensors; obstacle detection circuitry configured to detect obstacles in the path of the determined motion of the mobile device based on input from the camera; and warning generation circuitry configured to generate an alarm to the user based on the detected user attention focus, the determined motion and the detected obstacles.

28 Claims, 11 Drawing Sheets

SYSTEM AND METHOD FOR ACCIDENT AVOIDANCE DURING MOBILE DEVICE USAGE

FIELD

The present disclosure relates to mobile device usage, and more particularly, to obstacle detection and accident avoidance during usage of mobile devices.

BACKGROUND

Mobile devices and platforms, including smartphones and tablets, are ever increasing in use in all aspects of daily life. Many users of such devices concentrate their attention on the device screen, for texting, playing games, watching videos, etc., while walking or even running. This inattention to one's surroundings can lead to accidents, sometimes serious, such as stumbling over obstacles, tripping off of curbs, falling off a subway platform or falling into holes in the walkway, to name a few examples.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for accident avoidance during mobile device usage. Many users of such devices concentrate their attention on the device screen, for texting, playing games, watching videos, reading etc., while walking or even running. This may lead to accidents such as colliding with an obstacle or other danger, or tripping and falling over something in their path. Embodiments of the present disclosure may provide accident avoidance circuitry to reduce this risk, through detection and alerting of potential dangers, as will be described in greater detail below.

Mobile devices, such as smartphones and tablets, typically include cameras (often front and rear mounted) as well as a variety of sensors including environmental sensors such as accelerometers, pedometers, Global Positioning System (GPS), acoustic (microphones), etc. The accident avoidance circuitry may be configured to collect data from these (and potentially other types) of sensors for analysis to determine: (1) if the user is being distracted by an application executing on the device, (2) if the device and user are in motion, and (3) if there is an obstacle or other hazard along the path of motion. If these conditions are met, the accident avoidance circuitry may warn the user through a combination of video and/or audio alerts.

Figure 1:
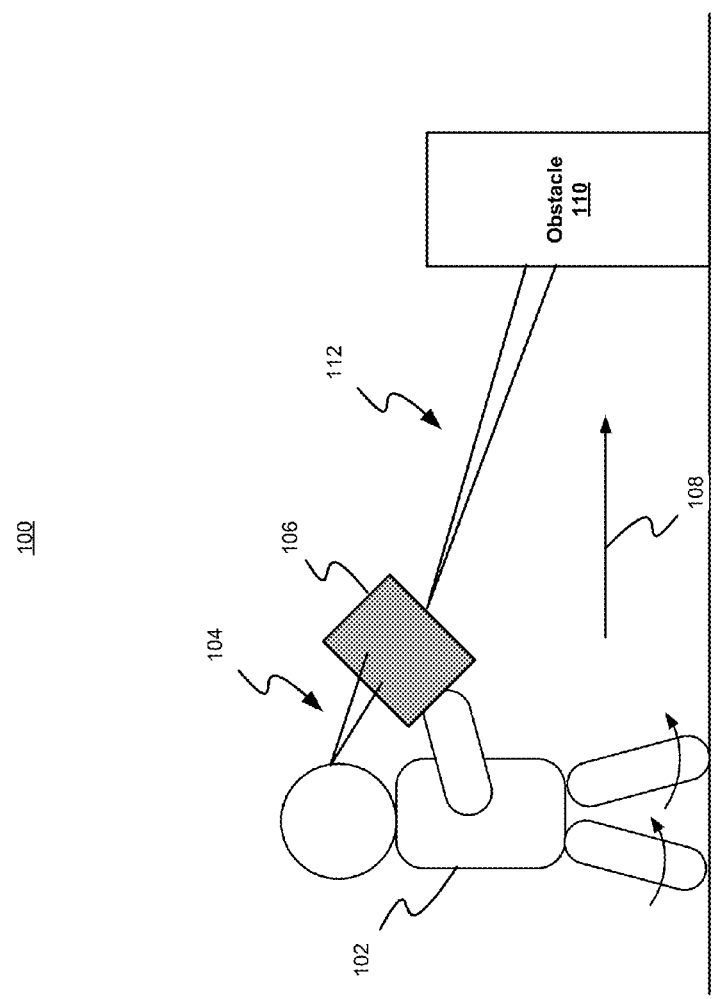
FIG. 1 illustrates a top level usage scenario of an example embodiment consistent with the present disclosure.

FIG. 1 illustrates a top level usage scenario 100 of an example embodiment consistent with the present disclosure. A user 102 of a mobile platform or mobile device 106 is shown to be traveling along a path 108 towards an obstacle 110. The user's attention 104 is focused on the device 106, typically on a user interface such as a screen, touchscreen or other type of display element, a keypad, or other control buttons of the device. Accident avoidance circuitry of device 106 may be configured to detect obstacle 110 and alert the user 102 of the potential impending collision or other adverse event.

Figure 2:
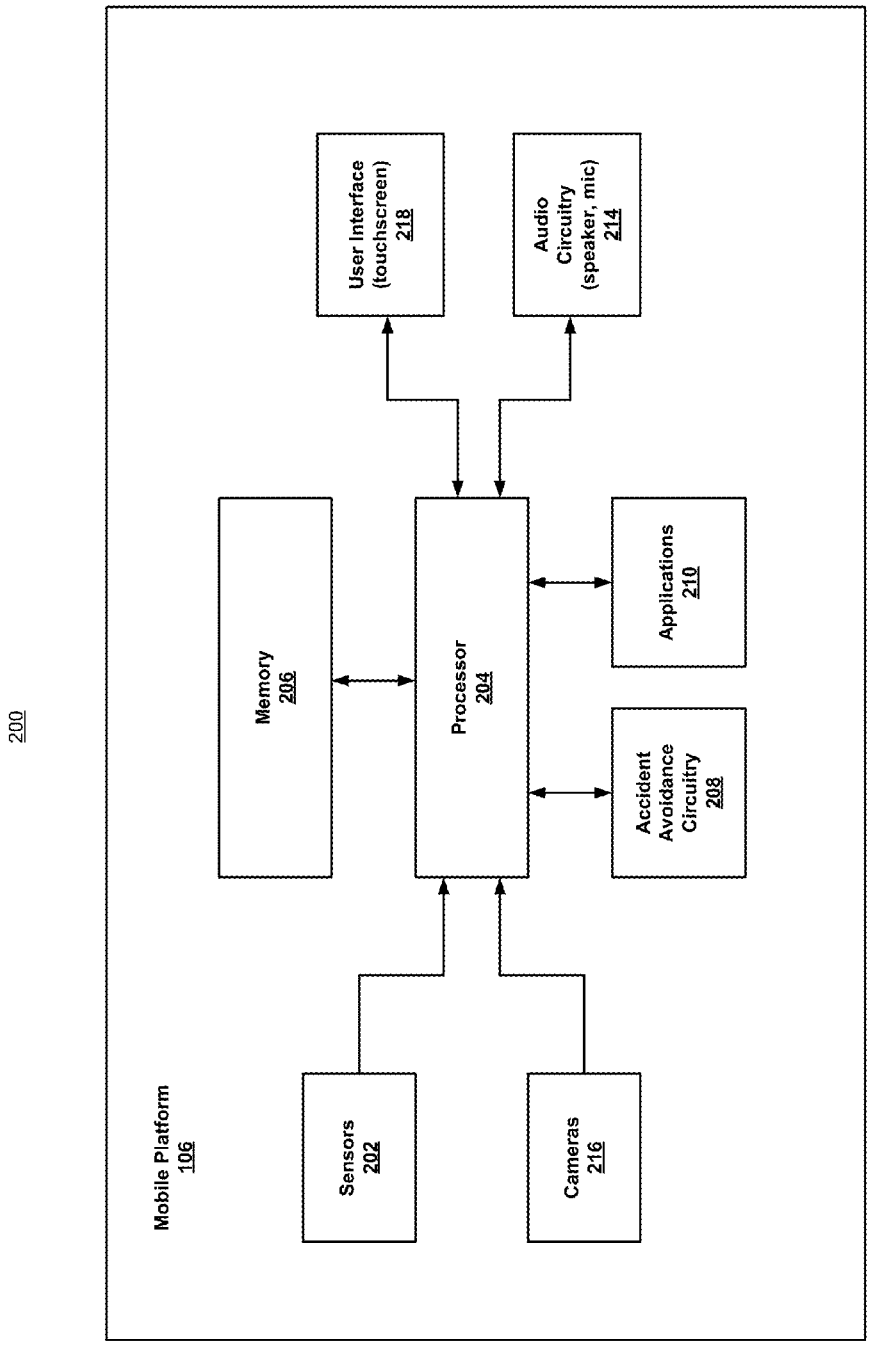
FIG. 2 illustrates a block diagram of one example embodiment consistent with the present disclosure.

FIG. 2 illustrates a block diagram 200 of one example embodiment consistent with the present disclosure. The mobile platform or device 106 is shown to include a processor 204, memory 206, one or more sensors 202, one or more cameras 216, a user interface 218, audio circuitry 214 and accident avoidance circuitry 208, the operation of which, in conjunction with sensors 202 and cameras 216, will be described in greater detail below. The processor may be configured to execute any number of applications 210 on behalf of the user. The availability of applications for mobile devices is virtually unlimited and may include, for example: texting, email, games, book viewers, music streaming and video streaming.

In some embodiments, the sensors 202 may include: accelerometers, gyroscopes, GPS, temperature sensors, pressure sensors, proximity sensors and pedometers.

In some embodiments, the cameras 216 may include a front mounted camera, configured to view the user, and a rear mounted camera configured to view the surrounding environment and particularly the area in front of the user. The term "front mounted," as used herein, refers to a camera on the front side of the device, positioned to face towards the user. The term "rear mounted," as used herein, refers to a camera on the back side side of the device, positioned to face away from the user. In some embodiments, cameras 216 may include a 3 dimensional (3-D) camera configured to provide depth information in addition to the usual red-green-blue (RGB) color data. In some embodiments, the device 106 may be configured with additional cameras located on the sides (e.g., the relatively narrower edges) of the device to provide additional viewing angle coverage.

Figure 3:
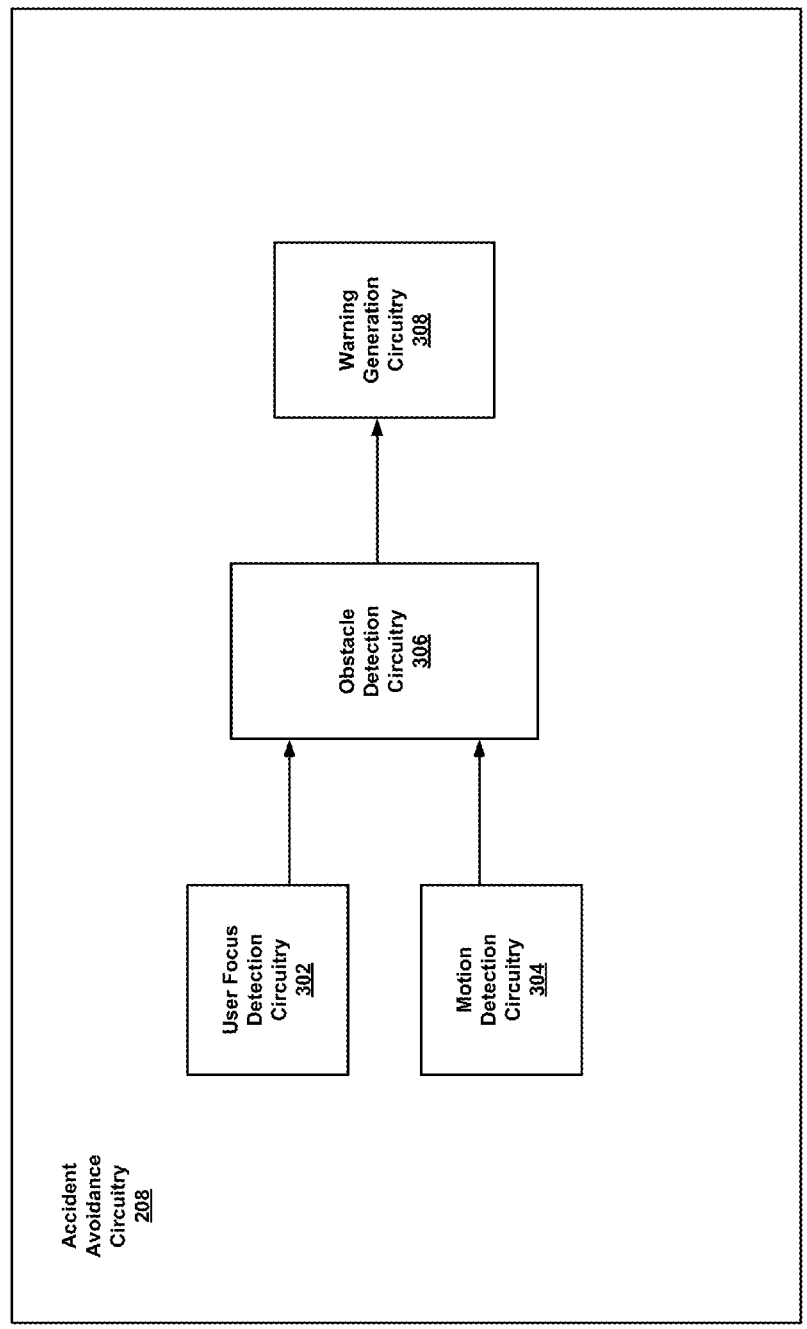
FIG. 3 illustrates a block diagram of another example embodiment consistent with the present disclosure.

FIG. 3 illustrates a block diagram 300 of another example embodiment consistent with the present disclosure. The accident avoidance circuitry 208 is shown in greater detail to include user focus detection circuitry 302, motion detection circuitry 304, obstacle detection circuitry 306 and warning generation circuitry 308.

Figure 4:
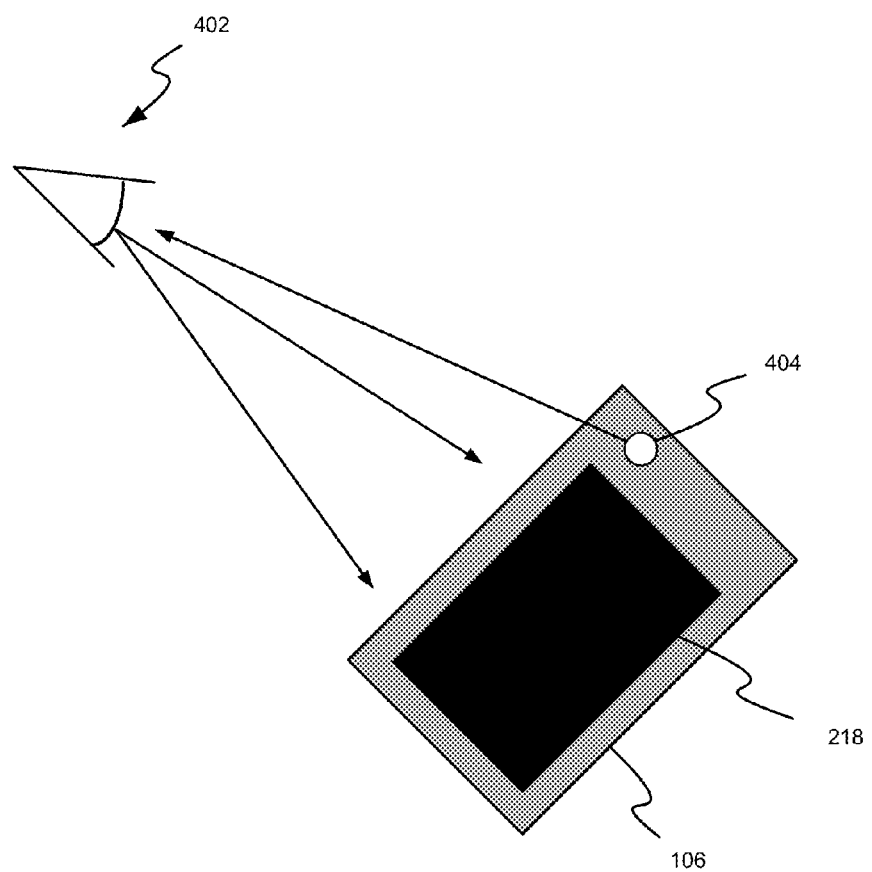
FIG. 4 illustrates eye movement tracking of another example embodiment consistent with the present disclosure.

User focus detection circuitry 302 may be configured to detect that the users focus of attention is directed towards the screen and/or application currently executing on the device. This may be accomplished through any combination of the following operations. User focus detection circuitry 302 may detect that the screen is turned on, is active and/or is illuminated. In some embodiments, the screen may generate an activity signal that can be monitored for this purpose. User focus detection circuitry 302 may detect that an application is in use (or executing on the processor) and requires visual attention. For example, a text message, map, game, picture or video may be currently displayed on the screen. In some embodiments, this may be determined by reading a process or task list that is maintained by an operating system of the mobile device. User focus detection circuitry 302 may detect that the user is interacting with the application through the touchscreen or other user interface. In some embodiments, the touchscreen may generate an activity signal that can be monitored for this purpose. Additionally, as illustrated in FIG. 4, user focus detection circuitry 302 may monitor and track the user's viewing direction and eye movement 402 through the front mounted camera 404 to determine if the user is reading from the screen 218.

Motion detection circuitry 304 may be configured to detect and estimate movement of the user (and device). Many mobile devices feature integrated accelerometers or other micro-electromechanical systems (MEMS) configured to provide data for health and activity tracking applications. These types of sensors may be employed by motion detection circuitry 304 to provide pedometer functionality such as, for example, counting steps, estimating distance walked and distinguishing between slow walking, fast walking and running. Accelerometers and pedometers may thus provide an indication of motion and speed. In some embodiments, the rear mounted camera may provide images to pattern recognition circuitry that may also be configured to detect motion and speed of the user.

Figure 5:
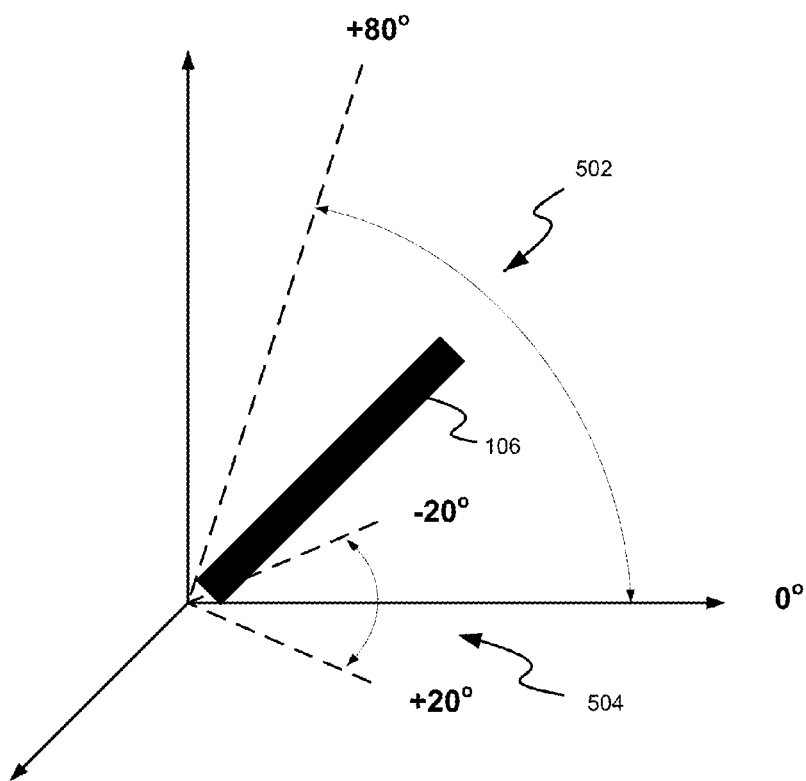
FIG. 5 illustrates angle of use detection of another example embodiment consistent with the present disclosure.

Additionally, in some embodiments, gyroscopic sensor may be configured to detect if the mobile device is being held within an expected range of vertical and horizontal angles that would be associated with on-the-walk usage. For example, as illustrated in FIG. 5, the vertical angle 502 may typically range from 0 to 80 degrees and the horizontal angle 504 may range from +20 to −20 degrees, while the device is being held by a user in motion.

Obstacle detection circuitry 306 may be activated based on signals from user focus detection circuitry 302 and motion detection circuitry 304 indicating that the user is in motion and that the user's attention may be distracted by the device. This may be associated with a state of increased alert. Under these conditions, obstacle detection circuitry 306 may activate the rear mounted camera, if it is not already on, and obtain images of the environment ahead of the user, for example along the path of motion. Obstacle detection circuitry 306 may further be configured to perform pattern recognition on these images to detect and identify the presence of obstacles, hazards or other potential dangers that the user may encounter if he proceeds along the current path of motion. Obstacle detection circuitry 306 may further be configured to determine a range or distance to these obstacles. In some embodiments, the sensors 202 may include proximity sensors, LIDAR (Light Detection and Ranging), or other suitable ranging sensors to provide range estimates. Proximity sensors may employ ultrasonic or infrared signals for ranging based on echo detection. In some embodiments, mobile device 106 may include a 3-D camera configured to provide depth data which may also be used to estimate or improve the estimate of the range to the obstacle. The 3-D camera may be incorporated in the rear mounted camera or may be a separate camera.

Warning generation circuitry 308 may be configured to calculate an estimated time until encounter with the obstacle based on a comparison of the estimated speed of the user and the range to the obstacle. An alert to the user may then be generated in time to prevent an accident. The alert may be any combination of visual or audio alarms. For example, a visual alert may include turning off the screen, blinking the screen, changing screen color or displaying messages such as "Attention" or "warning," etc. An audio alert may include an alarm sound, buzzing, siren, spoken warning, etc. In some embodiments, the device may be configured to vibrate to convey the alert signal.

Figure 6:
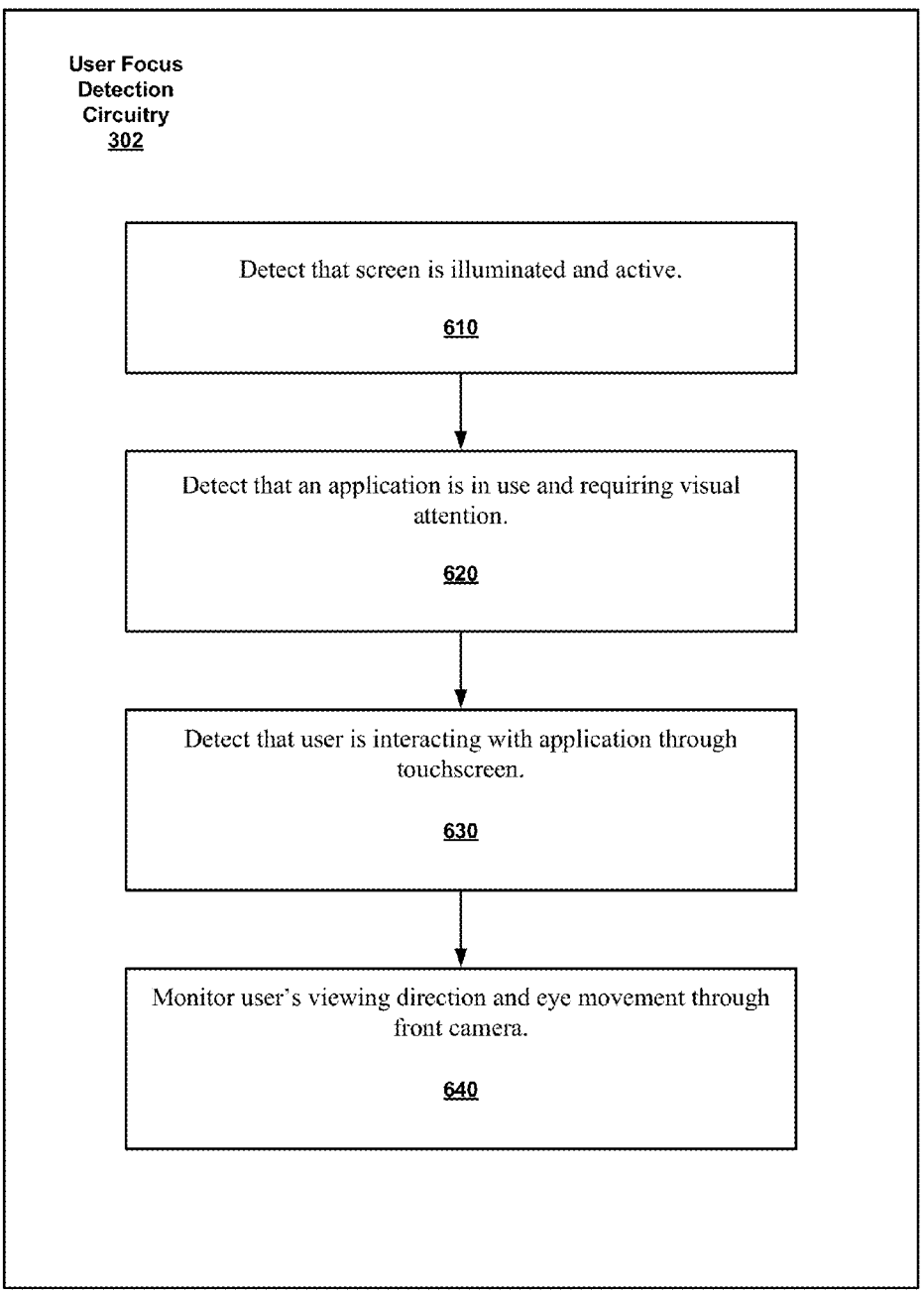
FIG. 6 illustrates a flowchart of operations of one example embodiment consistent with the present disclosure.

FIG. 6 illustrates a flowchart of operations 600 of one example embodiment consistent with the present disclosure. The operations provide a method for user focus detection. At operation 610, screen illumination and and/or activity are detected. At operation 620, it is determined whether an application is in use and may be requiring visual attention from the user. At operation 630, it is determined if the user is interacting with the application through the touchscreen or other user interface. At operation 640, the user's viewing direction and/or eye movements are monitored, for example through the front mounted camera.

Figure 7:
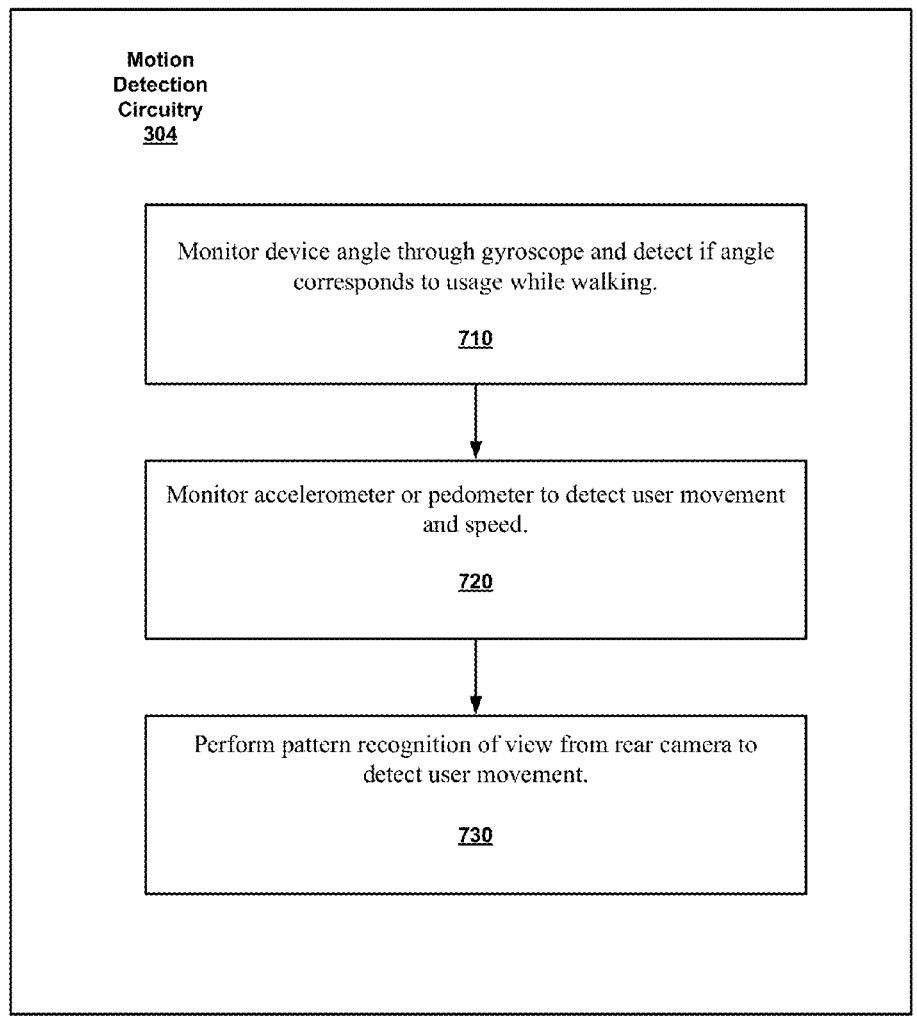
FIG. 7 illustrates a flowchart of operations of another example embodiment consistent with the present disclosure.

FIG. 7 illustrates a flowchart of operations 700 of another example embodiment consistent with the present disclosure. The operations provide a method for motion detection. At operation 710, the angle of the device is monitored, for example through a gyroscope or other suitable sensor, to determine if the angle falls in a range of angles that would typically be associated with device usage while in motion. At operation 720, an accelerometer or pedometer is monitored to detect user movement and speed. At operation 730, one or more images or video are obtained from the rear mounted camera and pattern recognition is performed on those images to detect user movement.

Figure 8:
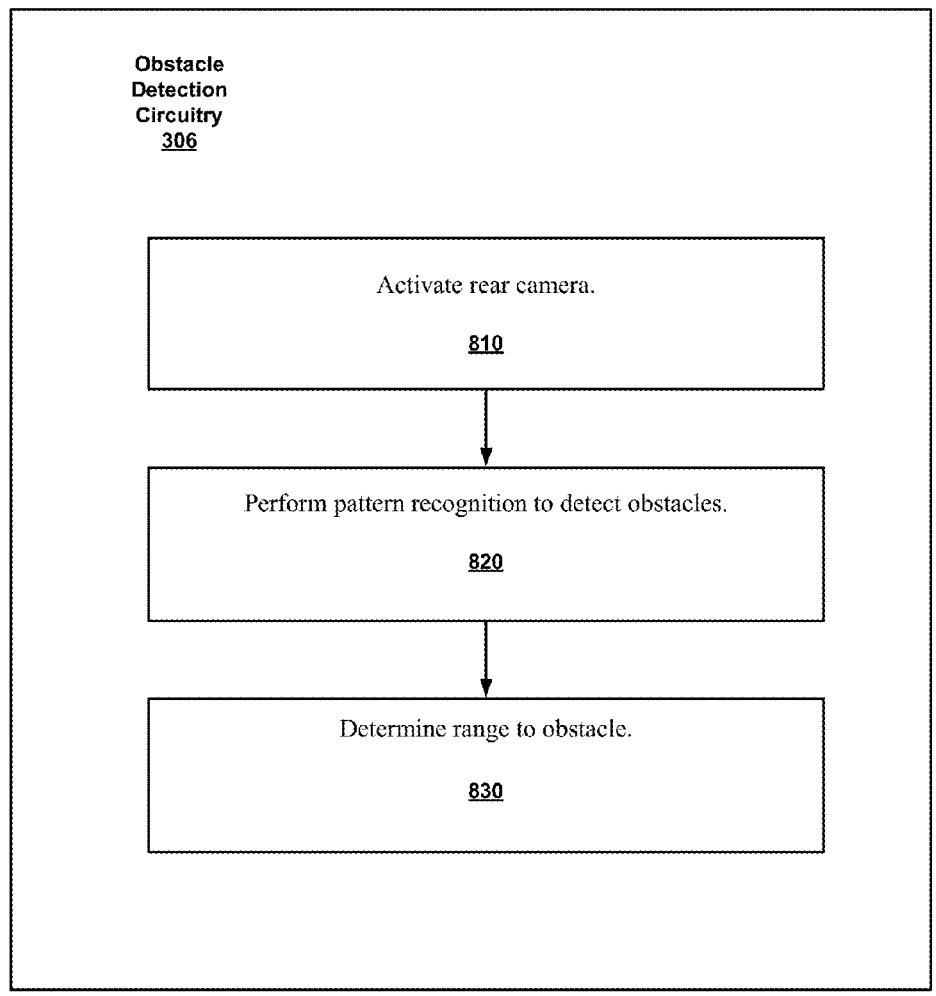
FIG. 8 illustrates a flowchart of operations of another example embodiment consistent with the present disclosure.

FIG. 8 illustrates a flowchart of operations 800 of another example embodiment consistent with the present disclosure. The operations provide a method for obstacle detection. At operation 810, the rear mounted camera is activated. At operation 820, one or more images or video are obtained from the rear mounted camera and pattern recognition is performed on those images to detect obstacles in the path of movement. At operation 830, a range or distance to the detected obstacles is determined, for example using a proximity detector, LIDAR or other suitable ranging sensor.

Figure 9:
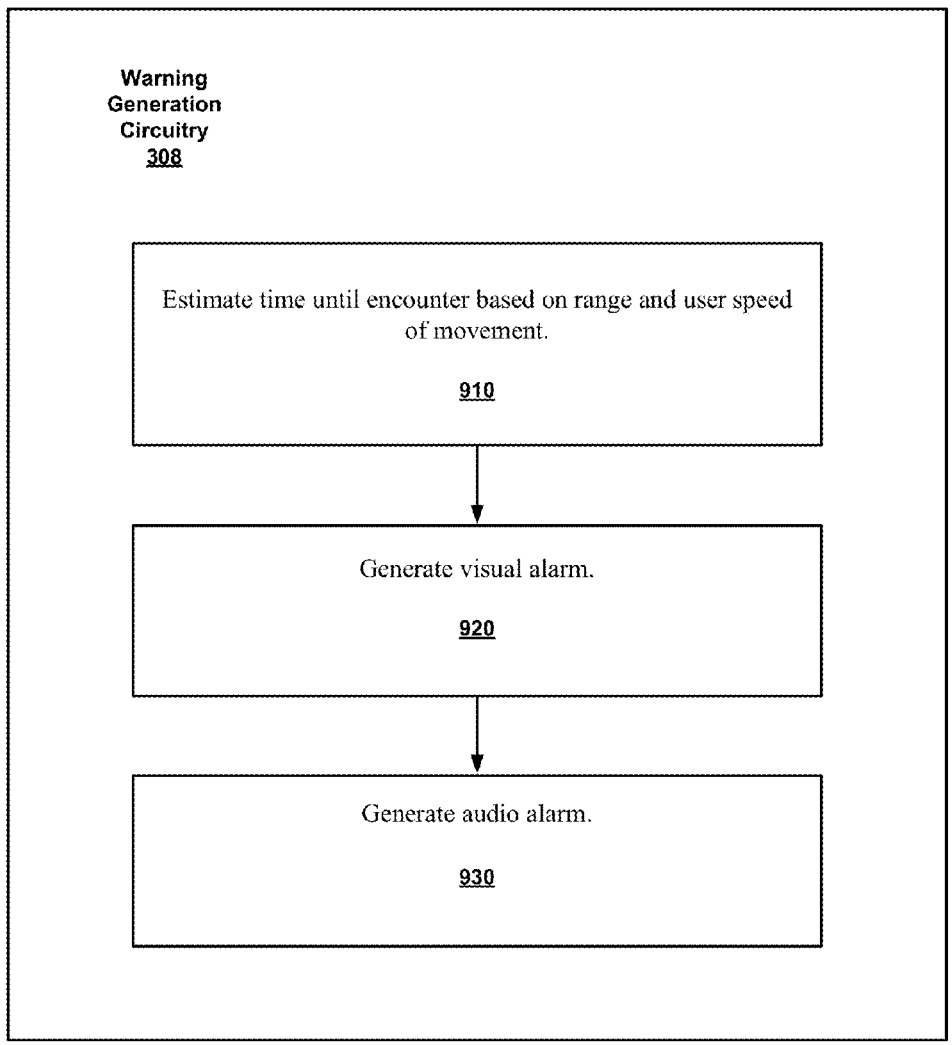
FIG. 9 illustrates a flowchart of operations of another example embodiment consistent with the present disclosure.

FIG. 9 illustrates a flowchart of operations 900 of another example embodiment consistent with the present disclosure. The operations provide a method for warning generation. At operation 910, a time until encounter with the obstacle is estimated based on the range and speed of user movement. At operation 920, a visual alarm is generated, for example through the screen or other display element. At operation 930, an audio alarm is generated, for example through the speaker.

Figure 10:
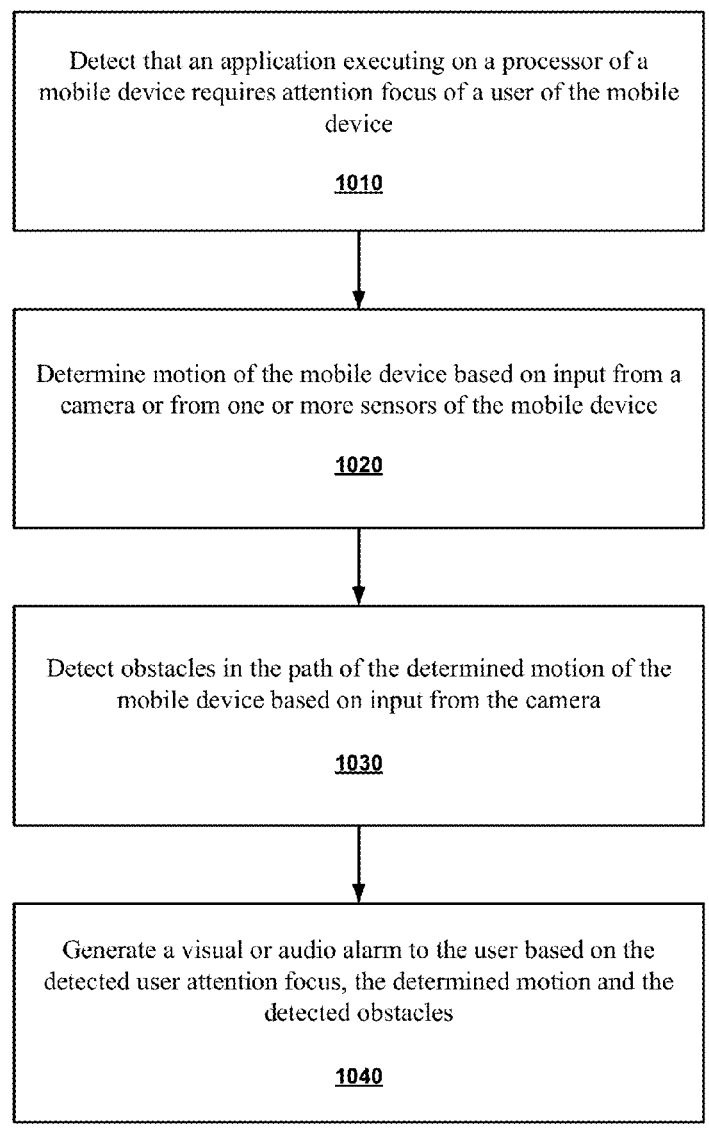
FIG. 10 illustrates a flowchart of operations of another example embodiment consistent with the present disclosure.

FIG. 10 illustrates a flowchart of operations 1000 of another example embodiment consistent with the present disclosure. The operations provide a method for accident avoidance during mobile device usage. At operation 1010, detection is performed as to whether an application executing on a processor of the mobile device requires attention focus of a user of the mobile device. At operation 1020, motion of the mobile device is determined based on input from a camera or from one or more sensors of the mobile device. At operation 1030, obstacles in the path of the determined motion of the mobile device are detected based on input from the camera. At operation 1040, a visual or audio alarm is generated for the user based on the detected user attention focus, the determined motion and the detected obstacles.

Figure 11:
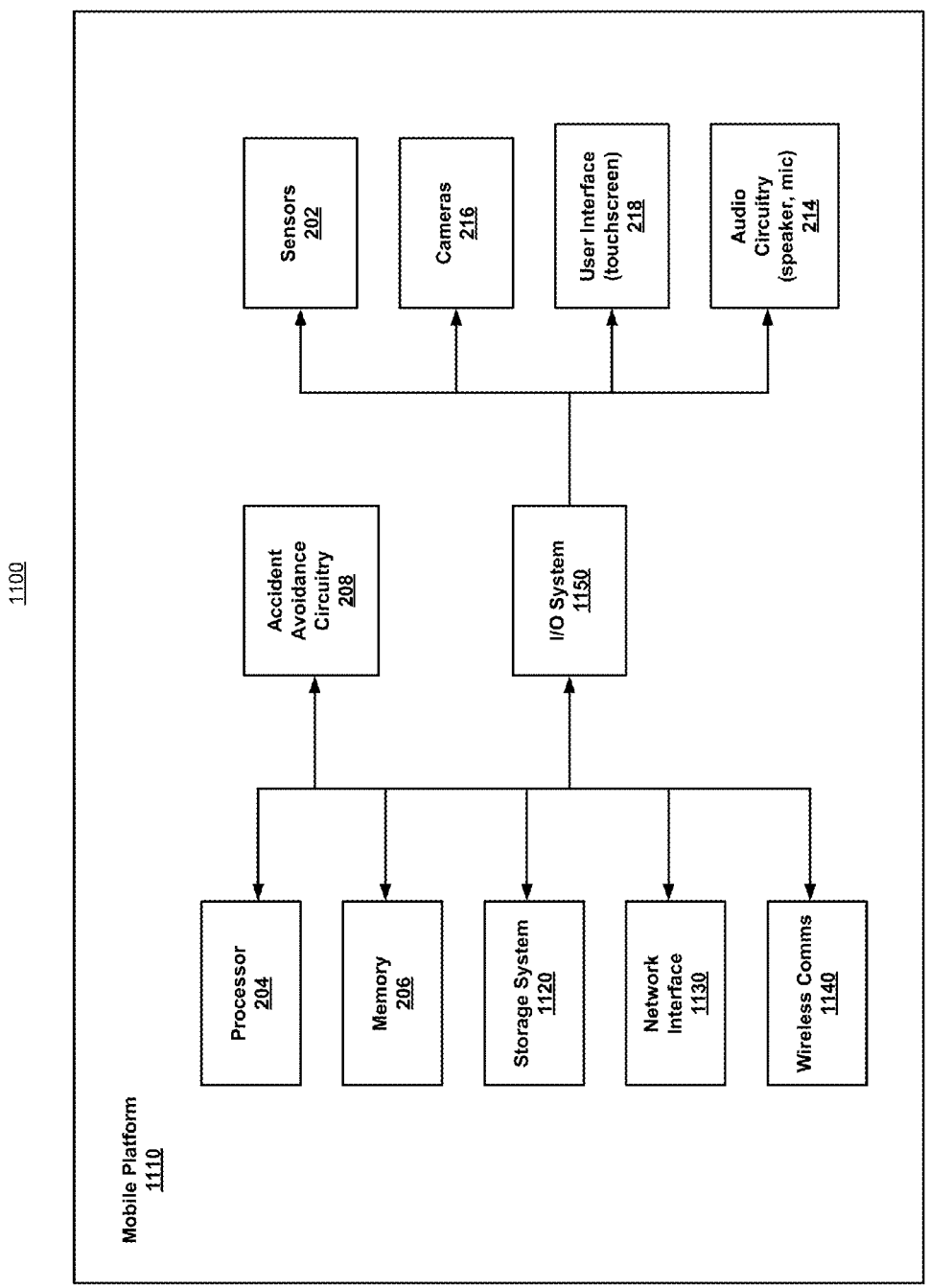
FIG. 11 illustrates a system diagram of a platform of another example embodiment consistent with the present disclosure.

FIG. 11 illustrates a system diagram 1100 of one example embodiment consistent with the present disclosure. The system 1100 may be a mobile platform 1110 or computing device such as, for example, a smart phone, tablet, smart tablet, personal digital assistant (PDA), mobile Internet device (MID), convertible tablet, notebook or laptop computer, or any other suitable device. The device may generally present various interfaces to a user via a user interface 218 which may be a touchscreen or other type of display element, and/or may include a keyboard or other types of control buttons. The touchscreen may include a liquid crystal display (LCD), thin film transistor LCD (TFT), light emitting diode display (LED), organic light emitting diode display (OLED) or any other suitable display type.

The system 1100 is shown to include a processor 204 and memory 206. In some embodiments, the processor 204 may be implemented as any number of processors or processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. The memory 206 may be coupled to the processors. The memory 206 may be any of a wide variety of memories (including various layers of memory hierarchy and/or memory caches) as are known or otherwise available to those of skill in the art. It will be appreciated that the processors and memory may be configured to store, host and/or execute one or more applications or other types of software. These applications may include, but not be limited to, for example, any type of computation, communication, data management, data storage and/or user interface task. In some embodiments, these applications may employ or interact with any other components of the mobile platform 1110.

System 1100 is also shown to include a storage system 1120, for example an HDD (Hard Disk Drive) or SSD (Solid State Drive), coupled to the processor 204 and other platform components, and may be configured to provide longer term storage, for example, compared to memory 206.

System 1100 is also shown to include network interface circuitry 1130 and/or wireless communications circuitry 1140 which may be configured to provide wireless communication capabilities, such as, for example, cellular communications, Wireless Fidelity (WiFi), Bluetooth®, and/or Near Field Communication (NFC). The wireless communications may conform to or otherwise be compatible with any existing or yet to be developed communication standards including past, current and future version of Bluetooth®, Wi-Fi and mobile phone communication standards including LTE (Long-Term Evolution).

System 1100 is also shown to include an input/output (I/O) system or controller 1150 which may be configured to enable or manage data communication between processor 204 and other elements of system 1100 (e.g., sensors 202, cameras 216, user interface 218, audio circuitry 214, etc.) or other elements (not shown) external to system 1100. In some embodiments, additional elements may include voice recognition circuitry and/or gesture recognition circuitry (not shown), which may be coupled to or otherwise included with the microphone, cameras or user interface.

System 1100 is also shown to include accident avoidance circuitry 208 configured to reduce the risk of accident during mobile device operation as described previously.

It will be appreciated that in some embodiments, one or more of the components of system 1100 may be combined in a system-on-a-chip (SoC) architecture. In some embodiments, the components may be hardware components, firmware components, software components or any suitable combination of hardware, firmware or software.

"Circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Any of the operations described herein may be implemented in one or more storage devices having stored thereon, individually or in combination, instructions that when executed by one or more processors perform one or more operations. Also, it is intended that the operations described herein may be performed individually or in any sub-combination. Thus, not all of the operations (for example, of any of the flow charts) need to be performed, and the present disclosure expressly intends that all sub-combinations of such operations are enabled as would be understood by one of ordinary skill in the art. Also, it is intended that operations described herein may be distributed across a plurality of physical devices, such as processing structures at more than one different physical location. The storage devices may include any type of tangible device, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions.

Thus, the present disclosure provides systems, devices, methods and computer readable media for accident avoidance during mobile device usage. The following examples pertain to further embodiments.

According to Example 1 there is provided a mobile device configured for accident avoidance. The mobile device may include a processor; a camera coupled to the processor; one or more sensors coupled to the processor; and accident avoidance circuitry. The accident avoidance circuitry may further include: user focus detection circuitry to detect that an application executing on the processor requires attention focus of a user of the mobile device; motion detection circuitry to determine motion of the mobile device based on input from the camera or from the one or more sensors; obstacle detection circuitry to detect obstacles in the path of the determined motion of the mobile device based on input from the camera; and warning generation circuitry to generate an alarm to the user based on the detected user attention focus, the determined motion and the detected obstacles.

Example 2 may include the subject matter of Example 1, further including a user interface; and the user focus detection circuitry further to detect that the user interface is active and that the user is interacting with the user interface.

Example 3 may include the subject matter of Examples 1 and 2, and the camera is a front mounted camera positioned on the mobile device to view the user; and the user focus detection circuitry is further to monitor user viewing direction and user eye movement through the front mounted camera to detect user attention focus on the application.

Example 4 may include the subject matter of Examples 1-3, and the camera is a rear mounted camera positioned on the mobile device to view surrounding environment; and the obstacle detection circuitry is further to perform pattern recognition to detect and recognize the obstacles.

Example 5 may include the subject matter of Examples 1-4, and the motion detection circuitry is further to determine speed of motion of the device; the obstacle detection circuitry is further to determine range to the obstacle; and the warning generation circuitry is further to estimate time until encounter of the user with the obstacle based on the speed and the range.

Example 6 may include the subject matter of Examples 1-5, and the sensors include a pedometer or an accelerometer; and the motion detection circuitry is further to determine the speed of motion of the device based on data received from the pedometer or the accelerometer.

Example 7 may include the subject matter of Examples 1-6, and the user interface is to present the visual alarm.

Example 8 may include the subject matter of Examples 1-7, and the sensors include a proximity detector; and the obstacle detection circuitry is further to determine range to the obstacle based on data obtained from the proximity sensor.

Example 9 may include the subject matter of Examples 1-8, and the camera is a 3 dimensional (3-D) camera; and the obstacle detection circuitry is further to determine range to the obstacle based on depth data obtained from the 3-D camera.

Example 10 may include the subject matter of Examples 1-9, and the mobile device is one of a smartphone, a tablet, a notebook, a laptop or a personal digital assistant.

Example 11 may include the subject matter of Examples 1-10, and the user interface is a touchscreen.

According to Example 12 there is provided a method for accident avoidance during mobile device usage. The method may include detecting that an application executing on a processor of the mobile device requires attention focus of a user of the mobile device; determining motion of the mobile device based on input from a camera or from one or more sensors of the mobile device; detecting obstacles in the path of the determined motion of the mobile device based on input from the camera; and generating a visual or audio alarm to the user based on the detected user attention focus, the determined motion and the detected obstacles.

Example 13 may include the subject matter of Example 12, further including detecting that a user interface of the mobile device is active and that the user is interacting with the user interface, to detect the user attention focus on the application.

Example 14 may include the subject matter of Examples 12 and 13, further including monitoring user viewing direction and user eye movement through the camera, to detect the user attention focus on the application, and the camera is a front mounted camera positioned on the mobile device to view the user.

Example 15 may include the subject matter of Examples 12-14, further including performing pattern recognition on an image obtained from the camera, to detect and recognize the obstacles, and the camera is a rear mounted camera positioned on the mobile device to view the surrounding environment.

Example 16 may include the subject matter of Examples 12-15, further including: estimating speed of the determined motion of the device; determining range to the obstacle; and estimating time until encounter of the user with the obstacle based on the speed and the range.

Example 17 may include the subject matter of Examples 12-16, further including estimating the speed of motion based on data received from the sensors, and the sensors include a pedometer or an accelerometer.

Example 18 may include the subject matter of Examples 12-17, and the user interface is to present the visual alarm.

Example 19 may include the subject matter of Examples 12-18, further including estimating range to the obstacle based on data received from the sensors, and the sensors include a proximity detector.

Example 20 may include the subject matter of Examples 12-19, further including estimating range to the obstacle based on depth data received from the camera, and the camera is a 3 dimensional (3-D) camera.

According to Example 21 there is provided at least one computer-readable storage medium having instructions stored thereon which when executed by a processor result in the following operations for accident avoidance during mobile device usage, the operations including: detecting that an application executing on a processor of the mobile device requires attention focus of a user of the mobile device; determining motion of the mobile device based on input from a camera or from one or more sensors of the mobile device; detecting obstacles in the path of the determined motion of the mobile device based on input from the camera; and generating a visual or audio alarm to the user based on the detected user attention focus, the determined motion and the detected obstacles.

Example 22 may include the subject matter of Example 21, further including detecting that a user interface of the mobile device is active and that the user is interacting with the user interface, to detect the user attention focus on the application.

Example 23 may include the subject matter of Examples 21 and 22, further including monitoring user viewing direction and user eye movement through the camera, to detect the user attention focus on the application, and the camera is a front mounted camera positioned on the mobile device to view the user.

Example 24 may include the subject matter of Examples 21-23, further including performing pattern recognition on an image obtained from the camera, to detect and recognize the obstacles, and the camera is a rear mounted camera positioned on the mobile device to view the surrounding environment.

Example 25 may include the subject matter of Examples 21-24, further including: estimating speed of the determined motion of the device; determining range to the obstacle; and estimating time until encounter of the user with the obstacle based on the speed and the range.

Example 26 may include the subject matter of Examples 21-25, further including estimating the speed of motion based on data received from the sensors, and the sensors include a pedometer or an accelerometer.

Example 27 may include the subject matter of Examples 21-26, and the user interface is to present the visual alarm.

Example 28 may include the subject matter of Examples 21-27, further including estimating range to the obstacle based on data received from the sensors, and the sensors include a proximity detector.

Example 29 may include the subject matter of Examples 21-28, further including estimating range to the obstacle based on depth data received from the camera, and the camera is a 3 dimensional (3-D) camera.

According to Example 30 there is provided a system for accident avoidance during mobile device usage. The system may include: means for detecting that an application executing on a processor of the mobile device requires attention focus of a user of the mobile device; means for determining motion of the mobile device based on input from a camera or from one or more sensors of the mobile device; means for detecting obstacles in the path of the determined motion of the mobile device based on input from the camera; and means for generating a visual or audio alarm to the user based on the detected user attention focus, the determined motion and the detected obstacles.

Example 31 may include the subject matter of Example 30, further including means for detecting that a user interface of the mobile device is active and that the user is interacting with the user interface, to detect the user attention focus on the application.

Example 32 may include the subject matter of Examples 30 and 31, further including means for monitoring user viewing direction and user eye movement through the camera, to detect the user attention focus on the application, and the camera is a front mounted camera positioned on the mobile device to view the user.

Example 33 may include the subject matter of Examples 30-32, further including means for performing pattern recognition on an image obtained from the camera, to detect and recognize the obstacles, and the camera is a rear mounted camera positioned on the mobile device to view the surrounding environment.

Example 34 may include the subject matter of Examples 30-33, further including: means for estimating speed of the determined motion of the device; means for determining range to the obstacle; and means for estimating time until encounter of the user with the obstacle based on the speed and the range.

Example 35 may include the subject matter of Examples 30-34, further including means for estimating the speed of motion based on data received from the sensors, and the sensors include a pedometer or an accelerometer.

Example 36 may include the subject matter of Examples 30-35, and the user interface is to present the visual alarm.

Example 37 may include the subject matter of Examples 30-36, further including means for estimating range to the obstacle based on data received from the sensors, and the sensors include a proximity detector.

Example 38 may include the subject matter of Examples 30-37, further including means for estimating range to the obstacle based on depth data received from the camera, and the camera is a 3 dimensional (3-D) camera.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A mobile device comprising:
   a processor;
   a camera coupled to said processor;
   one or more sensors coupled to said processor; and
   accident avoidance circuitry comprising:
      user focus detection circuitry to detect that an application executing on said processor requires attention focus of a user of said mobile device;
      motion detection circuitry to determine motion of said mobile device based on input from said camera or from said one or more sensors;
      obstacle detection circuitry to detect obstacles in the path of said determined motion of said mobile device based on input from said camera; and
      warning generation circuitry to generate an alarm to said user based on said detected user attention focus, said determined motion and said detected obstacles.

2. The mobile device of claim 1, further comprising a user interface; and said user focus detection circuitry further to detect that said user interface is active and that said user is interacting with said user interface.

3. The mobile device of claim 1, wherein said camera is a front mounted camera positioned on said mobile device to view said user; and said user focus detection circuitry is further to monitor user viewing direction and user eye movement through said front mounted camera to detect user attention focus on said application.

4. The mobile device of claim 1, wherein said camera is a rear mounted camera positioned on said mobile device to view surrounding environment; and said obstacle detection circuitry is further to perform pattern recognition to detect and recognize said obstacles.

5. The mobile device of claim 1, wherein said motion detection circuitry is further to determine speed of motion of said device; said obstacle detection circuitry is further to determine range to said obstacle; and said warning generation circuitry is further to estimate time until encounter of said user with said obstacle based on said speed and said range.

6. The mobile device of claim 5, wherein said sensors comprise a pedometer or an accelerometer; and said motion detection circuitry is further to determine said speed of motion of said device based on data received from said pedometer or said accelerometer.

7. The mobile device of claim 2, wherein said user interface is to present said visual alarm.

8. The mobile device of claim 5, wherein said sensors include a proximity detector; and said obstacle detection circuitry is further to determine range to said obstacle based on data obtained from said proximity sensor.

9. The mobile device of claim 5, wherein said camera is a 3 dimensional (3-D) camera; and said obstacle detection circuitry is further to determine range to said obstacle based on depth data obtained from said 3-D camera.

10. The mobile device of claim 1, wherein said mobile device is one of a smartphone, a tablet, a notebook, a laptop or a personal digital assistant.

11. A method for accident avoidance during mobile device usage, said method comprising:
    detecting that an application executing on a processor of said mobile device requires attention focus of a user of said mobile device;
    determining motion of said mobile device based on input from a camera or from one or more sensors of said mobile device;
    detecting obstacles in the path of said determined motion of said mobile device based on input from said camera; and
    generating a visual or audio alarm to said user based on said detected user attention focus, said determined motion and said detected obstacles.

12. The method of claim 11, further comprising detecting that a user interface of said mobile device is active and that said user is interacting with said user interface, to detect said user attention focus on said application.

13. The method of claim 11, further comprising monitoring user viewing direction and user eye movement through said camera, to detect said user attention focus on said application, wherein said camera is a front mounted camera positioned on said mobile device to view said user.

14. The method of claim 11, further comprising performing pattern recognition on an image obtained from said camera, to detect and recognize said obstacles, wherein said camera is a rear mounted camera positioned on said mobile device to view the surrounding environment.

15. The method of claim 11, further comprising:
    estimating speed of said determined motion of said device;
    determining range to said obstacle; and
    estimating time until encounter of said user with said obstacle based on said speed and said range.

16. The method of claim 15, further comprising estimating said speed of motion based on data received from said sensors, wherein said sensors comprise a pedometer or an accelerometer.

17. The method of claim 12, wherein said user interface is to present said visual alarm.

18. The method of claim 15, further comprising estimating range to said obstacle based on data received from said sensors, wherein said sensors comprise a proximity detector.

19. The method of claim 15, further comprising estimating range to said obstacle based on depth data received from said camera, wherein said camera is a 3 dimensional (3-D) camera.

20. At least one non-transitory computer-readable storage medium having instructions stored thereon which when executed by a processor result in the following operations for accident avoidance during mobile device usage, said operations comprising:
    detecting that an application executing on a processor of said mobile device requires attention focus of a user of said mobile device;
    determining motion of said mobile device based on input from a camera or from one or more sensors of said mobile device;
    detecting obstacles in the path of said determined motion of said mobile device based on input from said camera; and
    generating a visual or audio alarm to said user based on said detected user attention focus, said determined motion and said detected obstacles.

21. The non-transitory computer-readable storage medium of claim 20, further comprising detecting that a user interface of said mobile device is active and that said user is interacting with said user interface, to detect said user attention focus on said application.

22. The non-transitory computer-readable storage medium of claim 20, further comprising monitoring user viewing direction and user eye movement through said camera, to detect said user attention focus on said application, wherein said camera is a front mounted camera positioned on said mobile device to view said user.

23. The non-transitory computer-readable storage medium of claim 20, further comprising performing pattern recognition on an image obtained from said camera, to detect and recognize said obstacles, wherein said camera is a rear mounted camera positioned on said mobile device to view the surrounding environment.

24. The non-transitory computer-readable storage medium of claim 20, further comprising:
    estimating speed of said determined motion of said device;
    determining range to said obstacle; and
    estimating time until encounter of said user with said obstacle based on said speed and said range.

25. The non-transitory computer-readable storage medium of claim 24, further comprising estimating said speed of motion based on data received from said sensors, wherein said sensors comprise a pedometer or an accelerometer.

26. The non-transitory computer-readable storage medium of claim 21, wherein said user interface is to present said visual alarm.

27. The non-transitory computer-readable storage medium of claim 24, further comprising estimating range to said obstacle based on data received from said sensors, wherein said sensors comprise a proximity detector.

28. The non-transitory computer-readable storage medium of claim 24, further comprising estimating range to said obstacle based on depth data received from said camera, wherein said camera is a 3 dimensional (3-D) camera.

* * * * *